United States Patent [19]

Ukita

[11] Patent Number: 4,987,596
[45] Date of Patent: Jan. 22, 1991

[54] KNOWLEDGE-GUIDED AUTOMATIC SPEECH RECOGNITION APPARATUS AND METHOD

[75] Inventor: Teruhiko Ukita, Fujisawa, Japan

[73] Assignee: Kabushiki Kaisha Toshiba, Kawasaki, Japan

[21] Appl. No.: 546,709

[22] Filed: Jun. 29, 1990

Related U.S. Application Data

[63] Continuation of Ser. No. 841,954, Mar. 20, 1986, abandoned.

[30] Foreign Application Priority Data

Mar. 25, 1985 [JP] Japan .................................. 60-59880

[51] Int. Cl.$^5$ ........................... G10L 5/00; G10L 5/04; G10L 5/06
[52] U.S. Cl. ......................................... 381/41; 381/43
[58] Field of Search .................. 364/513.5; 381/41–43

[56] References Cited

U.S. PATENT DOCUMENTS

| | | | |
|---|---|---|---|
| 4,481,593 | 11/1984 | Bahler | 381/43 |
| 4,489,434 | 12/1984 | Moshier | 381/43 |
| 4,555,796 | 11/1985 | Sakoe | 381/43 |
| 4,587,670 | 5/1986 | Levinson et al. | 381/43 |
| 4,713,777 | 12/1987 | Klovstad et al. | 381/513.5 |
| 4,718,092 | 1/1988 | Klovstad | 381/43 |
| 4,718,094 | 1/1988 | Bahl et al. | 381/43 |
| 4,761,815 | 8/1988 | Hitchcock | 381/43 |

FOREIGN PATENT DOCUMENTS

0125648 11/1984 European Pat. Off. .
2107101 4/1983 United Kingdom .

OTHER PUBLICATIONS

Bakis, "Spoken Word Spotting Via Centisecond Acoustic Status", IBM Technical Disclosure Bulletin, vol. 18, No. 10, Mar. 1976.
Bourlard et al., "Speaker Dependent Connected Speech Recognition Via Phonemic Markov Models", ICASSP85 Proceedings, Mar. 26–29, 1985, Tampa, FL.
Proc. 4th Int. Conf. Patter Recognition, 1978, pp. 1006–1008, "Application of Orthogonal Projection Principals to Simultaneous Phoneme Segmentation and Labeling of Continuous Speech", M. Jalanko et al.
Proc. IEEE Int. Conf. Acoust., Speech, Signal Processing, 1977, pp. 656–659, "A Method for Segmenting Acoustic Patterns with Applications to Automatic Speech Recognition", Bridle and Sedgwick.
IEEE Trans. Acoust., Speech Signal Processing, vol. ASSP. 25, No. 5, pp. 367–379, "The 1976 Modular Acoustic Processor (MAP)" (1977), N. R. Dixon and H. F. Silverman.
Systems, Computers, Controls, vol. 10, No. 1, Jan./Feb. 1979, pp. 17–26, Silver Spring, US; Y. Niitsu et al.: "A Method of Using Linguistic Information for Automatic Spoken Word Recognition".
IEEE Transactions on Audio and Electroacoustics, vol. AU-21, No. 3, Jun. 1973, pp. 239–249, New York, US; S. Itahashi et al.: "Discrete-Word Recognition Utilizing a Word Dictionary and Phonological Rules".

Primary Examiner—Gary V. Harkcom
Assistant Examiner—David D. Knepper
Attorney, Agent, or Firm—Oblon, Spivak, McClelland, Maier & Neustadt

[57] ABSTRACT

An acoustic pattern of continuous input speech is divided by an acoustic analyzer into frames of a predetermined time interval. A similarity calculator calculates similarities between frame data and the reference phonemic labels prestored in a dictionary memory, and supplies similarity data to a main processor, which has memories prestores speech duration data and connectability data. The main processor extracts, from among the references phonemic labels, those which satisfy phonetic/phonological conditions with respect to phonemes of the input speech. Similarity sum calculation is conducted only for the similarity data of the extracted labels.

5 Claims, 5 Drawing Sheets

F I G. 4
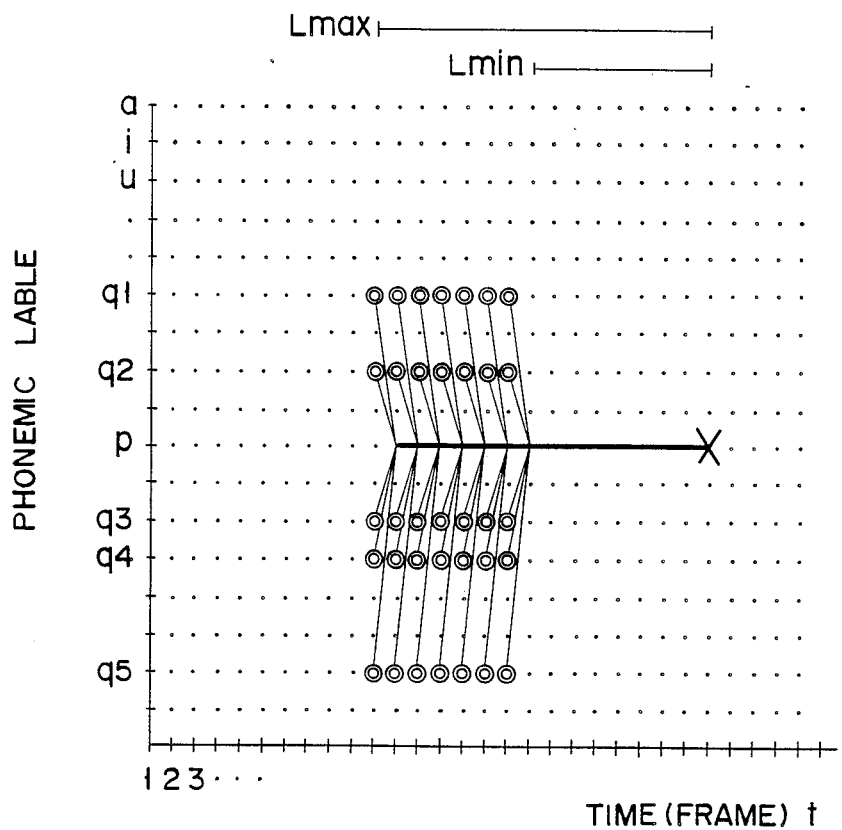

KNOWLEDGE-GUIDED AUTOMATIC SPEECH RECOGNITION APPARATUS AND METHOD

This application is a contiuation of application Ser. No. 06/841,954, filed on Mar. 20, 1986, now abandoned.

BACKGROUND OF THE INVENTION

The present invention relates to speech recognition and, more particularly, to a speech recognition apparatus and method for automatically recognizing continuous input speech in a naturally spoken language.

An apparatus for automatically recognizing continuous input speech is used as a man-machine interface for directly inputting speech data by an operator into a machine, and this apparatus is having increasingly greater importance. In order to analyze the sound pattern of a continuous utterance, and the extract characteristics thereof, as well as recognize them, various methods have been proposed. These methods have a common feature in that speech recognition is effected using a sequence of acoustically invariant units (i.e., phonemes) of input speech as minimum processing units.

A conventional method is known wherein input speech is divided into a sequence of segments (phonemes) (phonemic segmentation), and each segment is classified (labeled). In phonemic segmentation, segment boundaries between each two neighboring phonemes included in a continuous speech sound are detected by analyzing acoustic power and/or the spectral decomposition of an input sound pattern. More specifically, segmentation is performed such that a portion of speech in which a change in acoustic power or spectral decomposition over time is notable, is determined as a segment boundary. Labeling (i.e., comparing individual segments with reference phonemic labels to obtain a pattern matching result) is then performed. With this method, however, it is difficult to accurately detect segment boundaries and therefore difficult to effectively perform phonemic segmentation. This is because a change in acoustic power or spectral decomposition over time can easily be influenced by the speech speed and intonation of individual operators.

Another conventional method for automatic speech recognition has been proposed wherein the sound pattern of continuous input speech is divided into a plurality of frames at constant time intervals. Similarity of phonemes is calculated for each individual frame, and labeling is performed based on the similarity data. In this method, it is very complicated to edit phonemic labels, which are sequentially produced by calculating the similarity data between the divided pattern and a reference label pattern. In addition, it is difficult to develop an effective post-processing method for obtaining a recognition result based on the labeling of each frame under various conditions. Therefore, in an automatic speech recognition method according to the conventional method, various ad hoc processing rules are needed, depending on the situation, to overcome the above drawbacks. As a result, although a recognition processing procedure is complicated, improvement in recognition efficiency cannot be expected, and the reliability of the recognition result is thus degraded.

SUMMARY OF THE INVENTION

It is therefore an object of the present invention to provide a new and improved automatic speech recognition apparatus and method wherein continuous input speech can be recognized with high precision, and reliability in recognition can thus be improved.

It is a further object of the present invention to provide a new and improved automatic speech recognition apparatus and method wherein, when a sound pattern of continuous input speech is divided into a sequence of acoustic frames, each having a predetermined time interval, and labeling is performed for each frame, phonemes are recognized with high precision and reliability in recognition can thus be improved.

According to the automatic speech recognition technique of the present invention, an acoustic pattern of continuous input speech is divided at predetermined time intervals, thus producing a plurality of frame data. Reference acoustic patterns for utterance of phonemes in a human language naturally spoken by an operator are prestored in a dictionary memory as reference phonemic labels. Similarities between individual frame data and the reference acoustic patterns are calculated, thus producing a plurality of similarity data. With the method of the present invention, speech recognition is made by using at least one type of phonetic/phonological constraint data. A main processor prestores the phonetic/phonological data as additional conditions in the processing of phonemic labels. These conditions are associated with connectability and speech duration of phonemes.

The main processor checks if reference phonemic labels to be compared with the frame data include those that can satisfy the phonetic/phonological conditions for the input speech. Thereafter, the main processor extracts the reference phonemic labels which satisfy those conditions. If phonemic labels which do not satisfy the conditions are present, they are immediately excluded or rejected. Then, a sum of the similarity data of only the extracted reference phonemic labels is calculated and a series of phonemic labels having a maximum similarity are thus determined. In this way the divided acoustic patterns can be effectively matched with reference phonemic labels for input speech, and thus, the object of the present invention can be achieved.

BRIEF DESCRIPTION OF THE DRAWINGS

The present invention is best understood by reference to the accompanying drawings, in which:

FIG. 4 is an illustrative diagram showing routes for similarity sum calculation by the main processor of the apparatus of FIG. 1.

FIG. 6 is a table showing speech duration and connectability.

DETAILED DESCRIPTION OF THE PREFERRED EMBODIMENT

Figure 1:
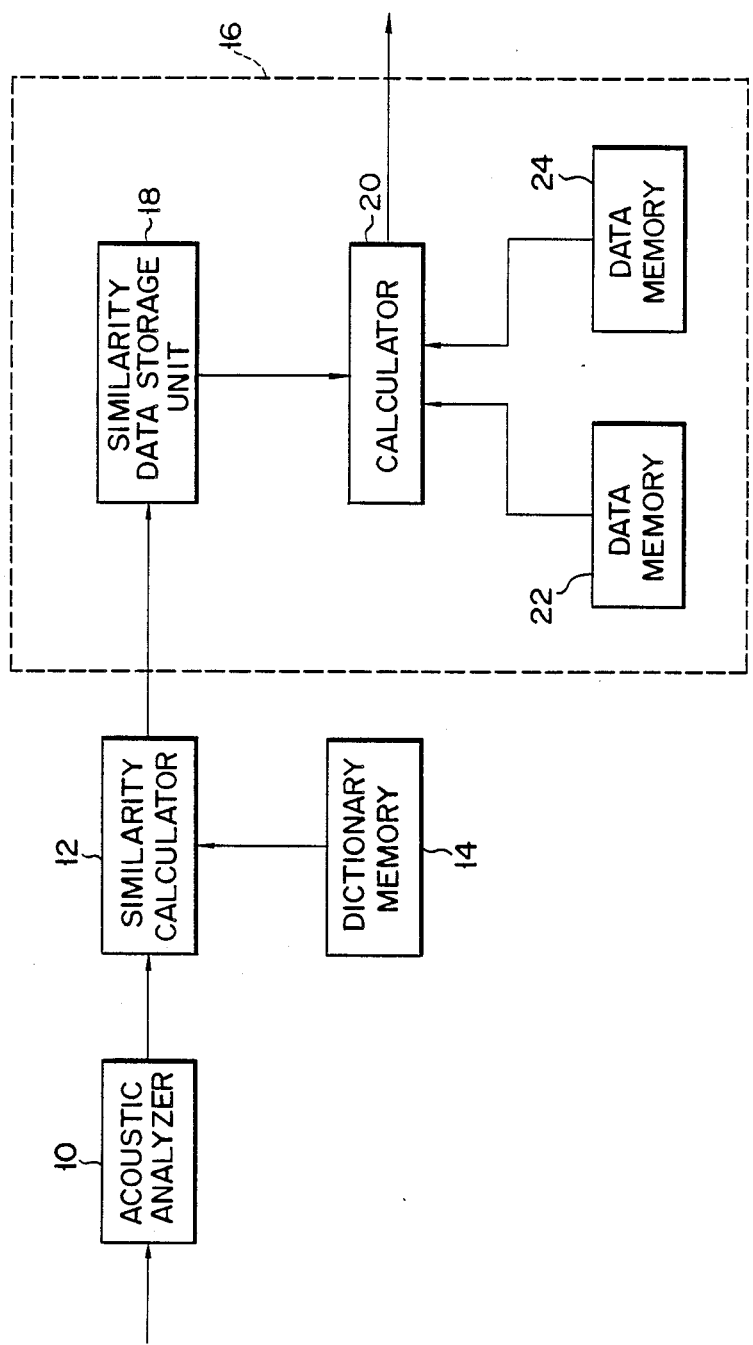
FIG. 1 is a block diagram showing a main part of an automatic speech recognition apparatus according to a preferred embodiment of the present invention.

A basic arrangement of an automatic speech recognition apparatus according to one preferred embodiment of the present invention will be described with reference to FIG. 1. Referring to FIG. 1, acoustic analyzer 10 receives continuous input speech pronounced by an operator. Analyzer 10 acoustically analyzes the acoustic pattern of the continuous input speech so as to divide it in predetermined time intervals (frame time), e.g., 8 ms, thereby producing frame data, each of which represents feature parameters. Analyzer 10 comprises a filter bank consisting of a plurality of bandpass filters. The filter bank can analyze input speech within the frequency band of 234 to 5,064 Hz, in accordance with a spectral decomposition method. The band-pass filters of the filter bank have different frequency band-pass characteristics, and form a plurality (e.g., 16) of band-pass channels. In analyzer 10, the energy of electrical sound signals generated from individual band-pass channels is used as calculated feature parameters. Calculated feature parameter data is stored in an input pattern memory (not shown) provided in analyzer 10.

Analyzer 10 is connected to similarity calculator 12, which is connected to dictionary memory 14. Calculator 12 receives frame data from analyzer 10 at predetermined time intervals and calculates similarities between the frame data and reference patterns prestored in memory 14. From this calculation, the similarities between the frame data of the input speech and the reference patterns stored in memory 14 are thus obtained. In this embodiment, the similarity calculation is conducted in accordance with, e.g., a multiple similarity calculation method, since this method can relatively effectively absorb variations in speech patterns.

Since the multiple similarity calculation method is adopted for this embodiment, memory 14 is required to have, as reference patterns, a plurality of vectors for phonemic classes orthogonal to each other. Although the amount of data to be stored in memory 14 is thus increased, since types of phonemes in one human language (e.g., Japanese language, English language or the like) are 30 to 50 at most, memory capacity and recognition processing time will not be adversely influenced in practical application.

The similarity calculation result generated from analyzer 12 is supplied to main processor 16 for calculating optimal labels. Processor 16 comprises similarity data storage memory 18, calculator of maximum cumulative similarities 20, and data memories 22 and 24 for storing recognition conditions derived from given phonetic/phonological knowledge. Memories 22 and 24 are connected to calculator 20. It should be noted that "phonetic/phonological knowledge" means rules associated with characteristics of individual phonemic speech patterns and/or phonetic relationship with other phonemes.

In this embodiment, memory 22 stores possible speech duration data for each phoneme, while memory 24 stores data associated with the connectability of phonemes. More specifically, memory 22 stores, in the table form, speech duration data (upper- and lower-limit values, e.g., 20 ms and 100 ms) which indicates possible speech durations of vowels (e.g., "a", "i", "u", etc.), and possible speech durations of explosives (e.g., "p", "t", etc.). Since vowels can be pronounced for a long or short period of time, the speech duration varies widely. Since explosives have limited speech durations, variations due to an operator's unique pronounciation are small. Memory 22 stores such phonological data. Memory 24 stores, also in the table format, data for phonemes, from a phonological point of view, which cannot be connected to another phoneme in the language. In Japanese, for example, vowel "i" or "e" cannot follow a contracted sound. Memory 24 stores such phonological constraint data. In this embodiment, speech duration data stored in memory 22 consists of minimum and maximum speech duration frame numbers Lmin and Lmax for a phonemic label. Connectability data stored in memory 24 is represented by CON(q,p). Data CON(q,p) is set at "1" when the transition from phoneme p to phoneme q is possible, and if it is not possible at "0". Speech duration and connectability data stored in memories 22 and 24 are represented in the following table and in FIG. 6.

TABLE

| Phonemic Label | Speech Duration (ms) | | Connectability | | | |
|---|---|---|---|---|---|---|
| | min. | max. | q1 | q2 | q3 | q4 |
| p1 | 20 | 100 | 1 | 1 | 1 | 1 |
| p2 | 32 | 160 | 1 | 0 | 1 | 0 |
| p3 | 32 | 400 | 0 | 1 | 1 | 1 |
| . | . | . | . | . | . | . |
| . | . | . | . | . | . | . |
| . | . | . | . | . | . | . |

The similarity data calculated by calculator 12 is temporarily stored in unit 18 and is then supplied to calculator 20, if necessary. In accordance with a speech recognition algorithm (to be described later), calculator 20 checks, using two data stored memories 22 and 24 (i.e., speech duration and connectability data) and based on the similarity data, if phonemes in a frame satisfy the phonetic/phonological conditions. Calculator 20 extracts only phonemic labels which satisfy the conditions, calculates a sum of the similarities of the extracted labels (preferably in accordance with a dynamic programming method), and generates a series of phonemic labels yielding a maximum similarity sum as a final recognition result. Calculator 20 uses predetermined rules of phonetic/phonological knowledge so as to extract only the phonemic labels which satisfy the conditions, thus determining candidates for maximum cumulative similarity calculation. During this procedure, phonemic labels which cannot satisfy the phonetic/phonological conditions are rejected and excluded from the following maximum cumulative similarity calculation. Thus, speech recognition precision is improved.

A pattern recognition operation of the automatic speech recognition apparatus according to the embodiment of the present invention will be described in detail with reference to the algorithm flow chart shown in FIG. 3. In this embodiment, Japanese will be exemplified as the human language. The recognition operation as for the other languages is basically the same.

Assume that a continuous input word "oto" (meaning "sound") is input in the apparatus as phonemes "q,p". This input speech pattern is acoustically analyzed by analyzer 10 and divided into frames. Thereafter, similarities of the feature parameters between the frames and the reference patterns of phonemic labels stored in memory 14 are calculated by calculator 12. The calculated results from calculator 12 are supplied to main processor 16 unique to the present invention.

Figure 2:
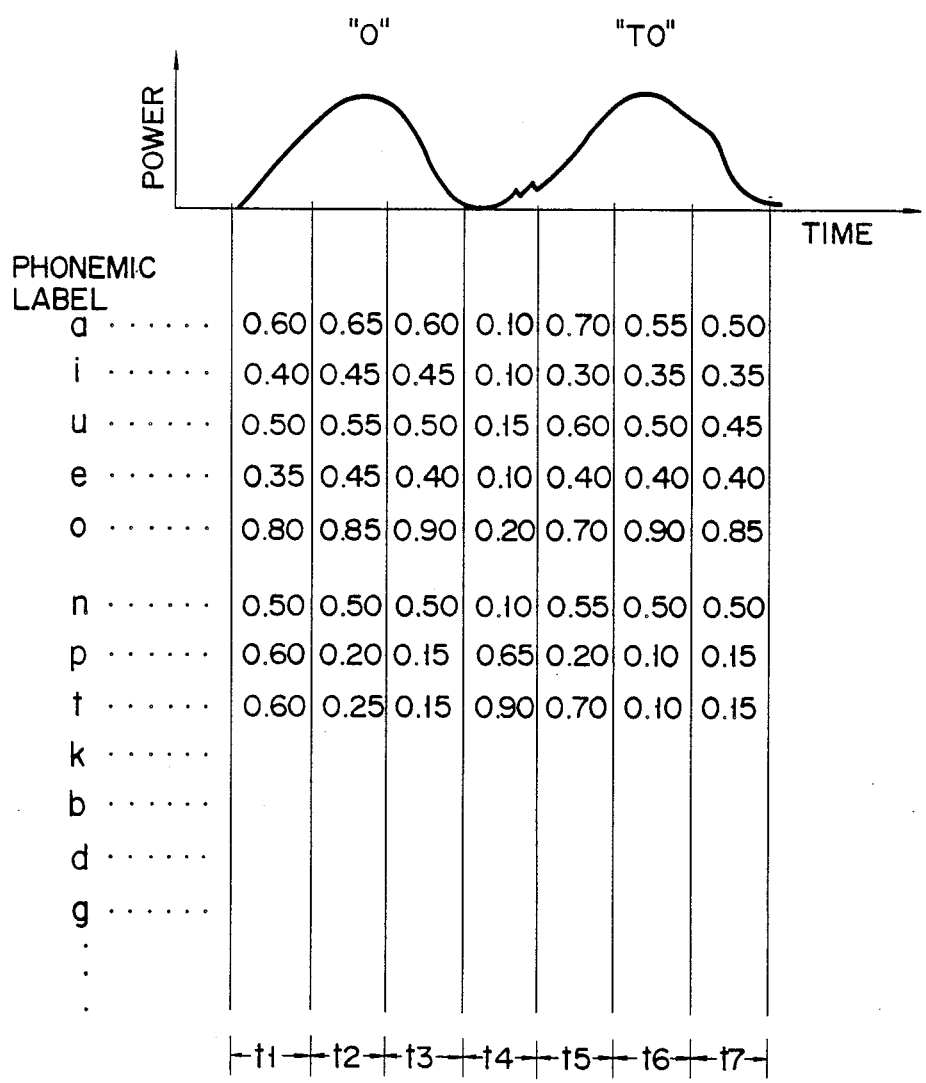
FIG. 2 is a graph showing a change, over time, in acoustic power of input speech when a Japanese input word "oto" (meaning "sound"), for example, is input in the apparatus of FIG. 1, and a diagram showing similarity data of feature parameters calculated between reference pattern and all phonemic labels for frames (t1 to t7)

FIG. 2 is a graph showing a change, over time, in acoustic power of the sample input word "oto". FIG. 2 also shows the similarity data for feature parameters calculated between the phonemic labels in the frames (t1 to t7) and the reference patterns. The calculated similarity data is temporarily stored in unit 18.

Figure 3:
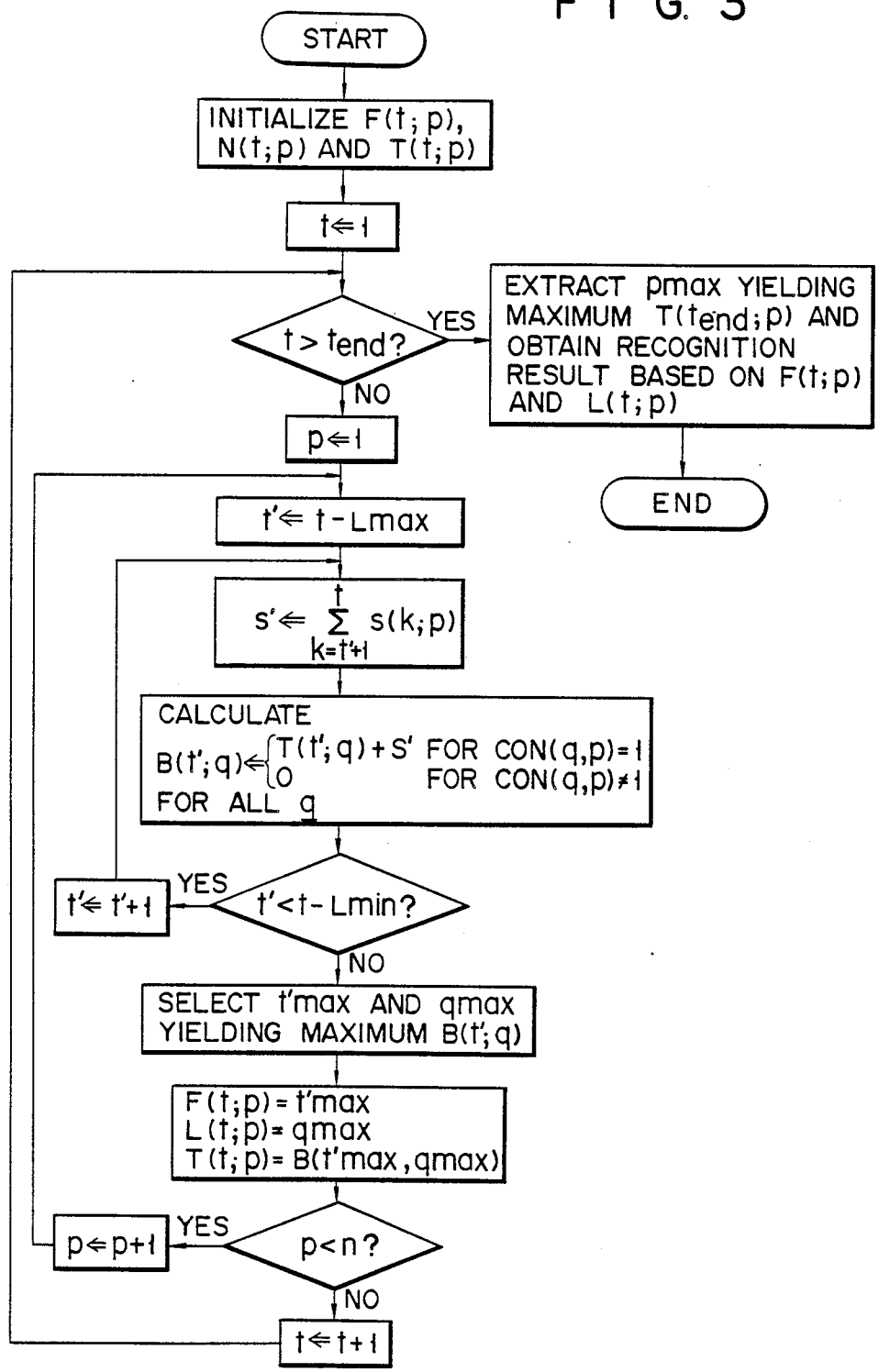
FIG. 3 is a flow chart showing a recognition algorithm for a main processor of the apparatus of FIG. 1.

Calculator 20 then executes recognition processing in accordance with the algorithm shown in FIG. 3. Calculator 20 initializes internal table memory areas to "0"(step 1000). More specifically, contents of memory area T(t;p) for storing cumulative similarities, memory area N(t;p) for storing phonemic label names, and pointer memory area F are cleared. Area F stores data F(t;p) representing a starting time of a tracking route of a maximum similarity of phonemic label p at time t (step 1010). Area N stores data N(t;p) representing a starting phoneme of the route. Area T stores data T(t;p) representing cumulative similarities in the route.

Subsequently, calculator 20 reads out phonemic data (phonemic labels) for each frame and similarity data calculated for each of them from unit 18 (step 1010). Assuming that a similarity of phonemic label p at frame t is S(t;p), calculator 20 excludes phonemic labels which do not match with the phonetic/phonological conditions, using speech duration data L and connectability data CON(q,p), within the range of $1 \leq t \leq t_{end}$ of frame t (the "no" if step 1020 starting with step 1040) where $t_{end}$ is the last input frame. More specifically, calculator 20 calculates equation (2) (step 1060) for frame t' which satisfies equation (1), as follows (the loop from step 1050 to step 1080):

$$t = Lmax^{(p)} \leq t' \leq t - Lmin^{(p)} \quad (1)$$

$$S' = \sum_{k=t'+1}^{t} S(k;p) \quad (2)$$

Calculator 20 also calculates equation (3) (step 1070) for all phonemic labels p (the "yes" loop of step 1120, step 1130, increments the phonemic labels):

$$B(t';q) = \begin{bmatrix} T(t';q) + S' & \text{(for } CON(q,p) = 1) \\ 0 & \text{(for } CON(q,p) \neq 1) \end{bmatrix} \quad (3)$$

When the above calculations for one frame t are completed (the "yes" loop of step 1080 to increment step 1090 has been exhausted), calculator 20 obtains maximum value Bmax, and then obtains t' and q, yielding maximum B(t';q) (to be referred to as t'max and qmax, respectively) (the "no" of step 1080, step 1100). Data Bmax, t'max, and qmax are stored in memory area T, F, and N respectively, so as to correspond with the frame t number (step 1110). The same processing is then repeated for each frame up to $t = t_{end}$ (the "no" loop of step 1120, step 1140, increments the frames). As a result, data Bmax, t'max, and qmax corresponding to frames t1 to t7 are stored in areas T, F, and N in table form.

When $t > t_{end}$ (the "yes" of step 1020), the above processing is completed and control is shifted to the step for obtaining phoneme labels having the maximum similarity sum. The maximum similarity sum is calculated in accordance with the dynamic programming method. More specifically, calculator 20 searches T(p;$t_{end}$) and detects the phoneme labels having the maximum similarity sum T($t_{end}$). The recognition result, i.e., correct phonemic labels and their starting and end positions, is thus sequentially obtained from data N(t;p) by going back from last frame $t_{end}$ based on the maximum similarity sum T($t_{end}$) and using pointer data F(t;p) (step 1030). The recognition result obtained thus has very high precision, since possible speech duration data of phonemic labels has been used so that positions of segmented phonemic labels are accurately detected and a series of phonemic labels having the maximum similarity sum have been found from phonemic labels.

FIG. 4 is an illustration showing examples of routes along which similarity sums are calculated by calculator 20. In FIG. 4, phonemes q1 to q5 which satisfy the phonetic/phonological conditions are located prior to phoneme p of phonemes "q,p". Similarity sum calculation is performed within the range of frame time between maximum and minimum speech duration data Lmax and Lmin, and goes from points "◎" to final point "X".

Figure 5:
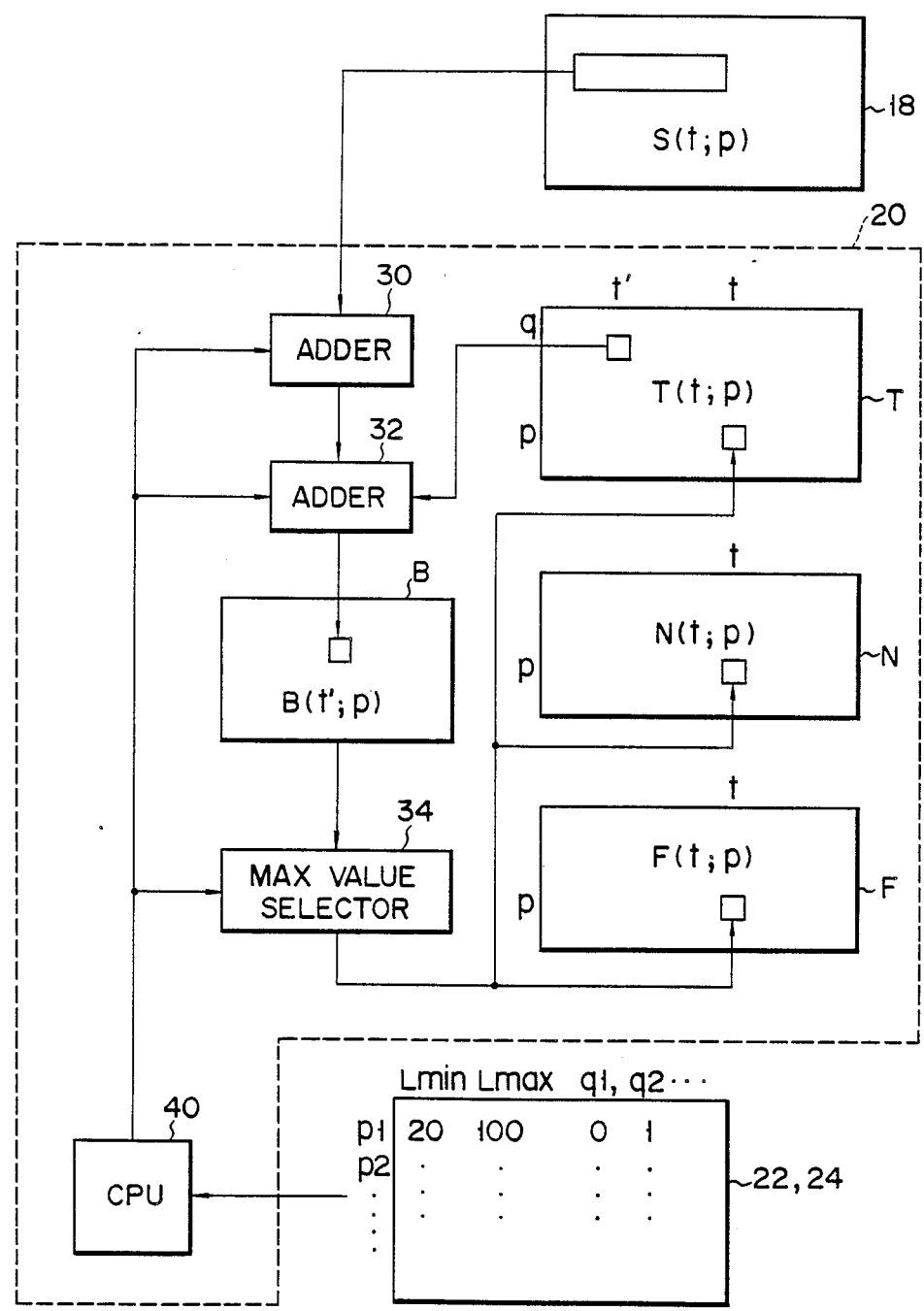
FIG. 5 is an illustrative diagram showing data flow in the main processor until maximum cumulative similarity sum data Bmax is calculated in recognition processing of the apparatus of FIG. 1.

FIG. 5 is an illustration showing data flow in main processor 16 during the above recognition processing, i.e., during the above calculation processing for calculating maximum cumulative similarity sum Bmax for each frame. As described above, calculator 20 comprises memory area T for storing the cumulative similarities T(t;p), memory area N for storing the phonemic labels N(t;p), and pointer memory area F. Similarity data based on the phonemic labels read out from unit 18 are supplied to 1st adder 30, under the control of CPU 40. CPU 40 excludes phonemic labels which do not satisfy the phonetic/phonological conditions for frame t within the range of $1 < t < t_{end}$, using speech duration data Lmin and Lmax, and connectability data CON(q,p). Therefore, only the similarity data which satisfies the above conditions is supplied to first adder 30.

First adder 30 then calculates S' in accordance with equation (2) for t' which satisfies equation (1). The calculated result from adder 30 is then transferred to second adder 32. Second adder 32 reads out T(t';q) from area T, and calculates B(t';q) in accordance with equation (3). The above process is repeated, and the calculated results are sequentially stored in memory area B. When the above calculations are completed for one frame t, max value selector 34 obtains maximum value Bmax for B(t';q), and then obtains t' and q yielding maximum B(t';q) (to be referred to t'max and qmax). Data Bmax, t'max, and qmax are supplied to memory areas T, F, and N, respectively, as shown in FIG. 5, so as to correspond with current frame number t. The above processing is similary repeated for each frame until $t = t_{end}$. As a result, data Bmax, t'max, and qmax corresponding to frames t1 to t7 are respectively stored in memory areas T, F, and N. Data stored in area T is then subjected to processing for obtaining the above-mentioned recognition result.

According to the apparatus of the present invention, the phonemic labels are checked to see if they satisfy the phonetic/phonological conditions associated with speech duration and connectability data (either or both of these can be used) after similarity data is calculated between all phonemic labels and frames obtained by dividing a continuous speech input at predetermined time intervals and before similarity sum calculation is performed. In this comparison, if there are labels which do not satisfy the above conditions, these labels are immediately excluded as phonemic label candidates to be subjected to maximum similarity sum calculation.

More specifically, even though phonemic labels may have relatively high similarities with corresponding input frame (phonemic labels similar to an input frame pattern in acoustic features, e.g., spectral pattern, are often present), unless they satisfy the above conditions, they are excluded from the recognition processing. Therefore, optimal segmentation can be effectively conducted based on similarity data of input frames with respect to the remaining phonemic labels. Similarity sums are calculated for only the phonemic labels which satisfy the phonetic/phonological conditions, and labels having the maximum similarity sum is thereby extracted (pattern matching is obtained). Therefore, unnecessary similarity calculation processing can be omitted, thus achieving high-speed recognition, and improving speech recognition precision.

Although the present invention has been shown and described with reference to this particular embodiment, various changes and modifications which are obvious to a person skilled in the art to which the invention pertains are deemed to lie within the scope of the invention.

In the above embodiment, calculator 12 calculates similarity data in accordance with a multiple similarity calculation method. However, statistical distance, simple similarity, Euclidean distance, and the like, which are known pattern recognition techniques, can be used for similarity calculation. However, when a distance (such as Euclidean distance) is used in place of similarity, the procedure for calculating a maximum value in the algorithm for obtaining optimal labels must be replaced with a procedure for calculating a miminum value.

In the above embodiment, phonemes have been described as phonemic labels. However, if syllables are used instead of phonemes, the same effect can be obtained in the above-mentioned apparatus. If the above processing method is applied to distance processing obtained at predetermined time intervals by a well-known continuous DP matching method, the same effect as those in the present apparatus can be expected.

What is claimed is:

1. An acoustic pattern recognition apparatus for automatically recognizing continuous input speech, said apparatus comprising:
    (a) acoustic analysis means for dividing an acoustic pattern of the continuous input speech at predetermined time intervals, so as to produce a plurality of frame data;
    (b) dictionary memory means for storing reference acoustic patterns of phonemes in a selected language as reference phonemic labels;
    (c) similarity calculation means, connected to said acoustic analysis means and said dictionary memory means, for calculating similarities between the frame data and the reference acoustic patterns, so as to produce a plurality of similarity data; and
    (d) main processor means, connected to said similarity calculation means, for prestoring based upon a preliminary processing, as a phonetic/phonological condition in the processing of phonemic labels, phonetic/phonological data including both speech duration and connectability for phonemes in the selected language and for using both of said phonetic and phonological conditions, for extracting during the main processing, from among the reference phonemic labels to be compared with the frame data, reference phonemic labels which satisfy said phonetic/phonological condition with respect to the phonemes of the input speech in a first data memory which contain upper and lower limit values of the speech duration phonemes in a tabular format, and a second data memory which has prestored data as to the connectability of phonemes, for rejecting the similarity data of the reference phonemic labels which fail to satisfy said phonetic/phonological condition, and for allowing only the similarity data of the extracted reference phonemic labels to be subjected to similarity sum calculation to thereby generate a series of phonemic labels having a maximum similarity sum as a recognition result.

2. The apparatus according to claim 1, wherein said main processor means further comprises:
    a similarity data memory which is connected to said similarity calculator means and temporarily stores the similarity data of the frame data.

3. The apparatus according to claim 2, wherein said main processor means calculates the maximum similarity sum of similarity data of the extracted reference phonemic labels using a dynamic programming method.

4. An acoustic pattern recognition method for automatically recognizing continuous input speech, said method comprising the steps of:
    (a) dividing an acoustic pattern of the continuous input speech at predetermined time intervals so as to produce a plurality of frame data;
    (b) reading out reference acoustic patterns of phonemes in a selected language prestored in a dictionary memory as reference phonemic labels;
    (c) calculating similarities between the frame data and the reference acoustic patterns, so as to produce a plurality of similarity data;
    (d) verifying as a preliminary process, whether reference phonemic labels, which satisfy phonetic/phonological data as a phonetic/phonological condition having at least both speech duration and connectability with respect to the phonemes of the input speech, are present in the reference phonemic labels to be compared with the frame data, to thereby extract reference phonemic labels which satisfy said phonetic/phonological condition including both speech duration and connectability for phonemes in the selected language;
    (e) rejecting the similarity data of the reference phonemic labels which fail to satisfy said phonetic/phonological condition, as a preliminary process, wherein when similarity data is unsatisfied with at least one condition, for speech duration or connectability being present, the similarity data is excluded from candidates for maximum similarity sum calculations; and
    (f) allowing only the similarity data of the extracted reference phonemic labels to be subjected to similarity sum calculation, as a main process, to generate a series of phonemic labels having a maximum similarity sum as a final recognition result.

5. The method according to claim 4, wherein a maximum similarity sum for the similarity data of the extracted reference phonemic labels is calculated using a dynamic programming method.

* * * * *